Figure 4:
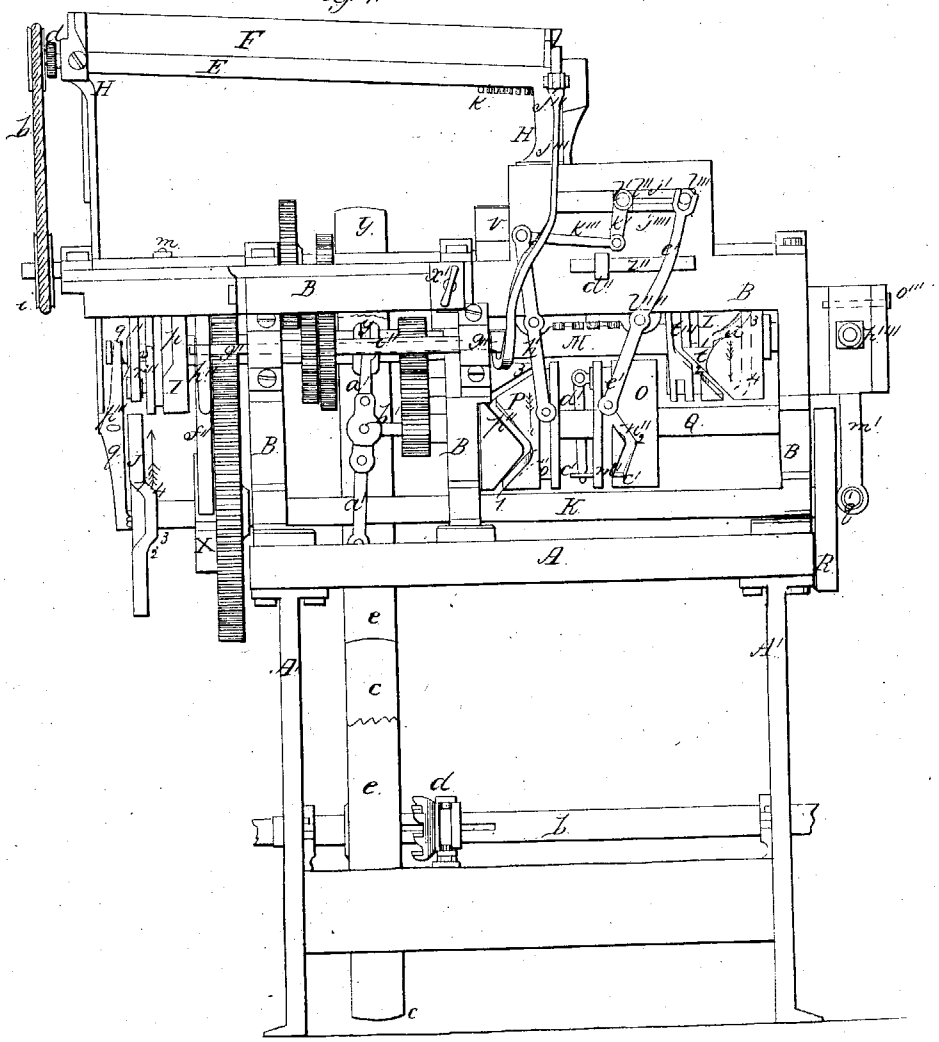

T. W. Harvey.
Making Wood Screws.
No. 641. Reissued Dec. 28, 1858.
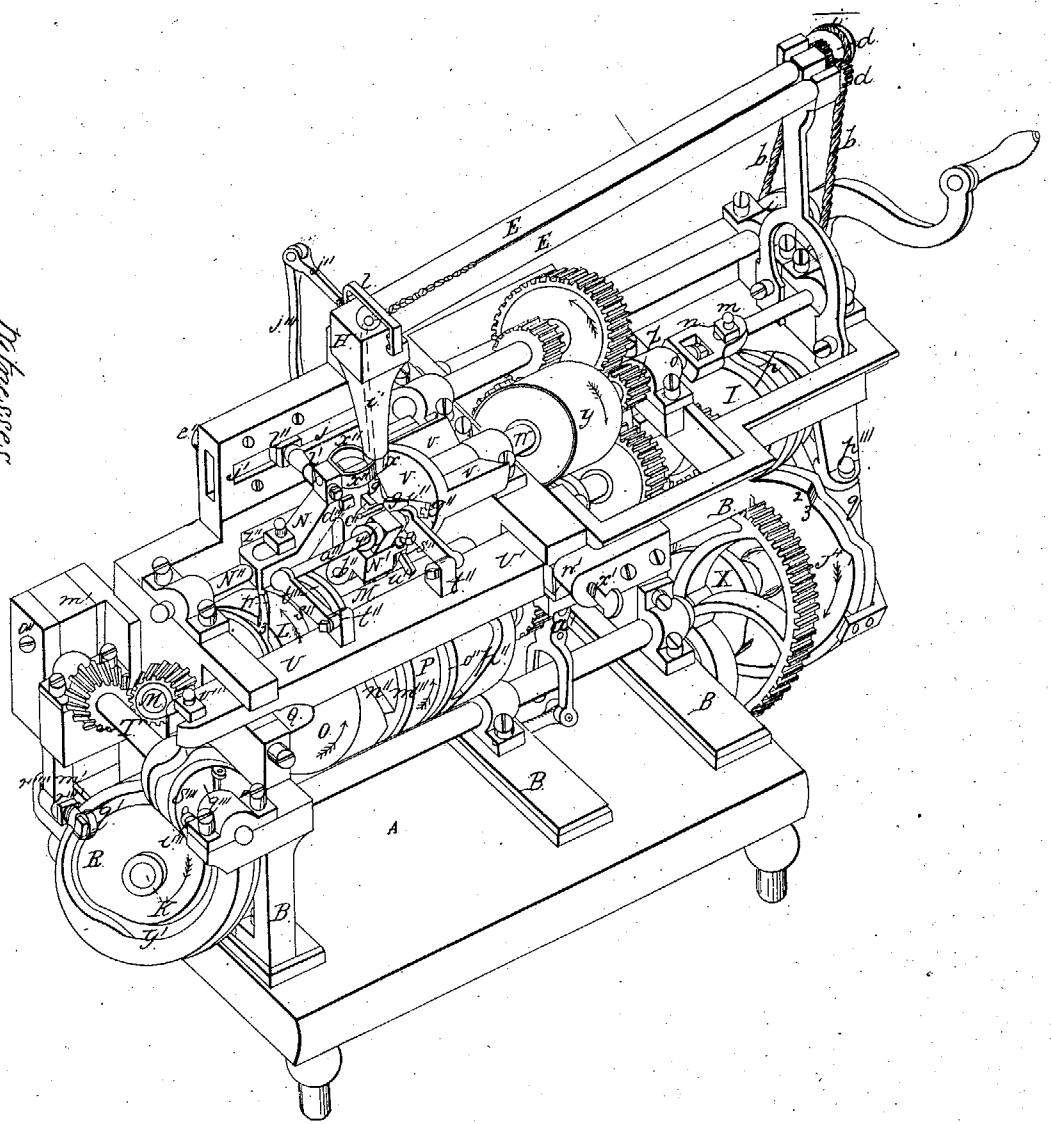
Witnesses
Wm. H. Nichols
Wm. M. Ingraham
H. A. Harvey
assignee

T. W. Harvey.
Making Wood Screws.
No. 641. Reissued Dec. 28, 1858.
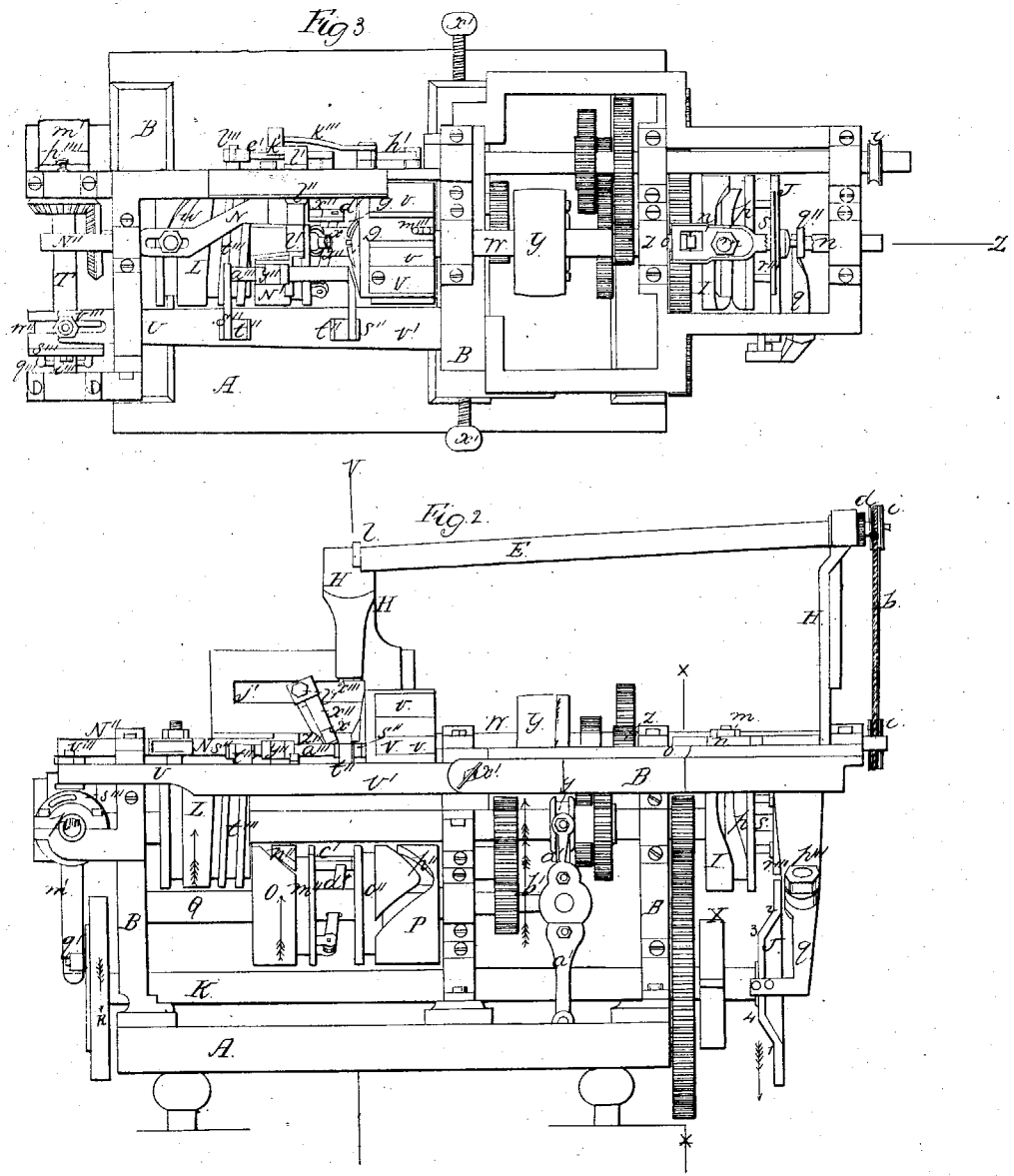
Witnesses.
Wm. H. Bishop
Wm. M. Ingraham
H. A. Harvey
Assignee Sheet 3, 5 Sheets.

T. W. Harvey.

Making Wood Screws.

No. 641. Reissued Dec. 28, 1858.

Witnesses
Wm H Bishop
Wm M Graham

H. T. Harvey
assignee

Sheet 4, 5 Sheets.
T. W. Harvey.
Making Wood Screws.
No. 641. Reissued Dec. 28, 1858.
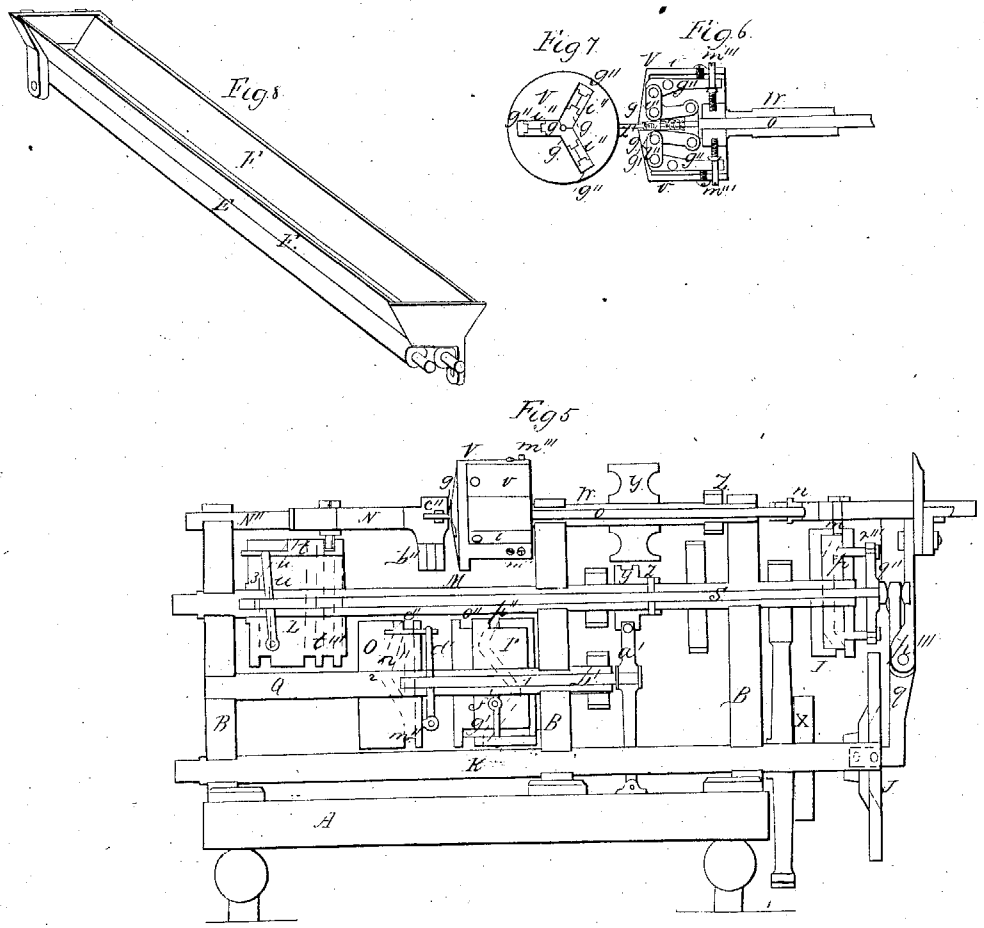
Witnesses.
Wm. H. Bishop
Wm. M. Ingraham
T. W. Harvey
assignee

T. W. Harvey.
Making Wood Screws.
No. 641. Reissued Dec. 28, 1858.
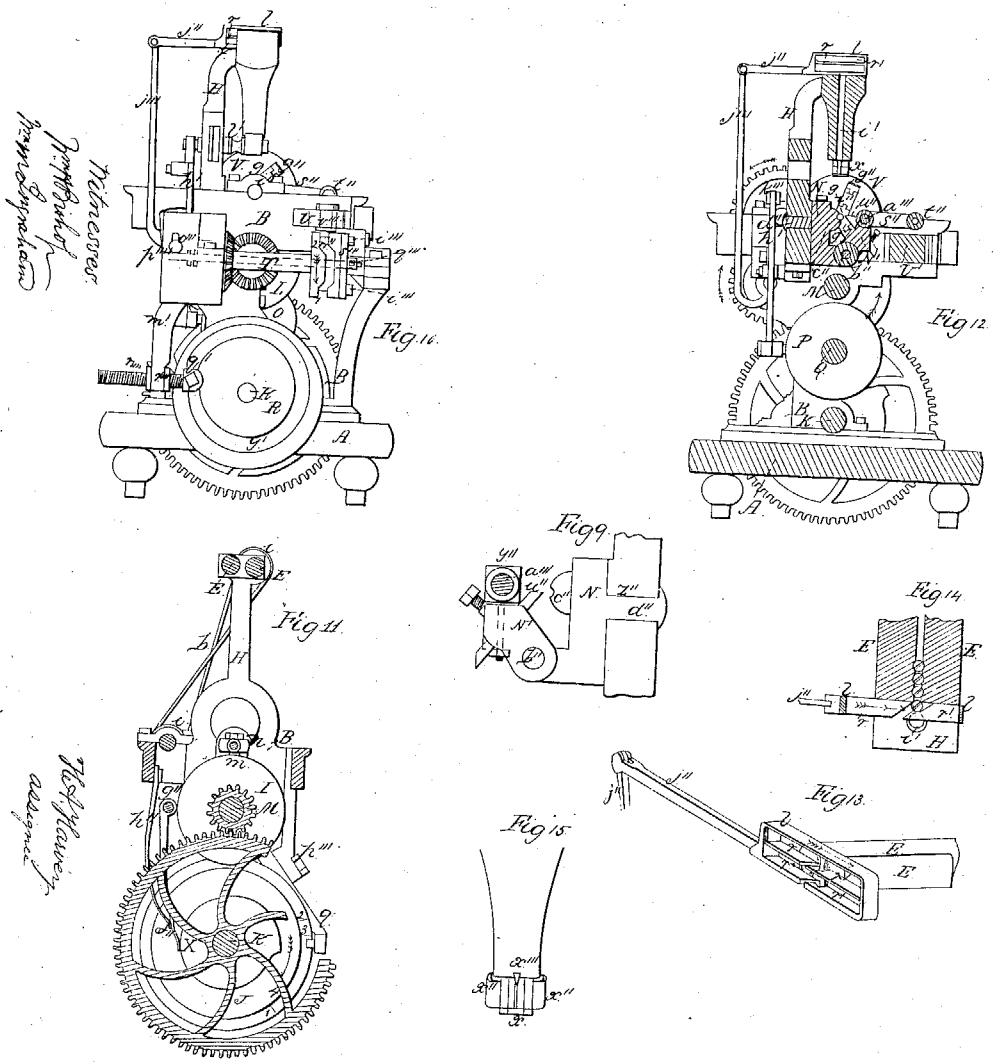
Witnesses.
Wm. H. Bishop
Wm. Ingraham
H. A. Harvey
assignee

UNITED STATES PATENT OFFICE.

H. A. HARVEY, OF NEW YORK, N. Y., ASSIGNEE, BY MESNE ASSIGNMENTS, OF THOMAS W. HARVEY.

IMPROVEMENT IN MACHINERY FOR CUTTING SCREWS.

Specification forming part of Letters Patent No. 4,548, dated May 30, 1846; Reissue No. 641, dated December 28, 1858.

*To all whom it may concern:*

Be it known that THOMAS W. HARVEY, of the city, county, and State of New York, deceased, did in his life-time invent new and useful Improvements in Machinery for Manufacturing Wood-Screws; and I do hereby declare that the following is a full, clear, and exact description of the principle or character which distinguishes the said invention from all other things before known, and of the manner of making, constructing, and using the same, reference being had to the accompanying drawings, making part of this specification, in which—

Figure 1 is a perspective view of the machine, taken in front. Fig. 2 is a front elevation; and Fig. 3 a plan. Fig. 4 is a back elevation. Fig. 5 is a vertical longitudinal section taken at the line Z Z of Fig. 3, and representing the shafts and the spindle or mandrel in and beyond the plane of the section as cut open to exhibit sliding rods within them. Figs. 6 and 7 are a section and front view of the chuck and gripping-jaws which hold and rotate the screw-blanks. Fig. 8 is a perspective view of the hopper; Fig 9, a section in front of the chasing-tool to exhibit more clearly its connections. Fig. 10 is an elevation of that end of the machine which is on the left side when looking at it from the front. Fig. 11 is a vertical transverse section taken at the line X X of Fig. 2. Fig. 12 is another transverse vertical section taken at the line V V of Fig. 2. Fig 13 is a perspective view of the delivery end of the hopper-rollers and discharging-slide; Fig. 14, a horizontal section of the same, and Fig. 15 a cross-section of the transferring-fingers as opened by a wedge-like projection on the lower end of the conducting tube.

The same letters indicate like parts in all the figures.

The first part of the said invention of the said THOMAS W. HARVEY relates to the method of arranging the screw-blanks in a continuous row from a promiscuous mass, that they may be delivered one by one with the heads in the same direction and without hand labor; and this part of the said invention consists in effecting the said purpose by means of two inclined rollers placed at a sufficient distance apart to permit the shanks of the screw-blanks freely to fall and hang between while the heads rest on their periphery, the rotation of one one or both of the said rollers having the effect to aid the screw-blanks in arranging themselves, and, in connection with their inclination, to cause them gradually to travel toward the lower or delivery end.

The second part of the said invention relates to the delivery of the screw blanks automatically from a row and conducting them to that part of the machine in which they are to be cut; and this part of the said invention consists in combining with the delivery end of the rollers, ways, or any equivalent therefor, a delivery and check slide, and a receiving and conducting tube, the delivery and check slide by its vibration performing the mechanical functions of taking or receiving and delivering the screw-blanks one by one from the row, and at each delivery checking the farther descent or progress of the row, while the receiving and conducting tube performs the functions of receiving each screw-blank as delivered and conducting it in the required direction to the place required for the after operations, whatever they may be.

The third part of the said invention relates to the operation of receiving the screw-blanks one by one from the conducting-tube and presenting them to the spindle or mandrel by which they are to be rotated for the after operations; and this part of the said invention consists in combining with the conducting-tube a transferrer which receives one screw-blank at a time from the conducting-tube, and which then carries it off and transfers it to the mandrel.

The fourth part of the said invention relates to the method of rotating the screw-blank for the threading operation; and consists in combining, with a rotating mandrel or spindle, and with suitable means for holding the screw-blank in line with such spindle or mandrel, a sliding-spring turn-screw to enter the nick of the screw-blank to rotate it against the cutting action of the cutter, the spring permitting the turn-screw to yield when coming in contact with the head of the blank when the nick is not in line, and by its tension forcing the turn-screw into the nick the moment the nick and turn-screw are brought in line by the rotation, the object of this being to avoid injuring the shank and head of the blank by gripping-jaws, which, when sufficient to insure the turning of the blank, generally do injure the shank and head; but the most important object of this part of the invention is to insure the accurate cutting of the thread. When the blank turns in the jaws after the commencement of the threading operation, the thread must be injured, for the reason that the pitch of the thread is always dependent upon the relations of the rotation of the mandrel or spindle and the chasing motion, and as these are positive, whenever the blank slips or fails to turn to that extent the positive relations are disturbed, and the thread must be injured; but by the use of a turn-screw fitting in the nick the blank must be turned with a positive motion, and hence the difficulty above pointed out cannot occur. With this view a turn-screw was applied for this purpose before the said invention of the said THOMAS W. HARVEY but not with a spring or yielding pressure, and in consequence it could not be applied in screw machinery with an automatic feed, because there is no automatic feed-motion known which can insert the blank with the nicks always in the same direction; but by the said improvement the turn-screw is brought into action without reference to the direction of the nick when the blank is introduced.

The fifth part of the said invention relates to the arrangement of the thread-cutter or chaser and the sliding rest, the latter of which is secured to a sliding chasing frame or carriage for the purpose of preventing the shank of the screw from yielding while under the action of the chaser, which latter is also properly secured in an adjustable tool-holder or head jointed by its lower end to the chasing slide frame, the upper end sliding on a rod secured to a sway-bar, one end of which is jointed to an adjusting-slide and the other governed by a cam, which gives the requisite taper and point to the screw. The chasing-frame is governed in its motion by a chasing-cam groove on a cylinder, the groove being so formed as to move the chasing-slide to carry the cutter gradually from the commencement of the thread toward the point with a motion so regulated relatively to the rotation of the mandrel as to give the pitch of the thread, and then moved back again for another cut, one part of the groove crossing the other for this purpose, and that part of the groove which moves the chasing-slide for chasing the thread is in the form of a helix, and at the end thereof it crosses the helix with a sudden curve to run back the chaser, and at the end of the helix the groove runs into another groove, the junction of these two being provided with a sliding switch connected with a sliding rod within the chasing-cam shaft and governed by another cam, called the "index-cam," that when the thread is chased the switch is shifted, which opens this latter groove to draw the chasing-frame far enough out of the way to admit of the operation of the transferrer to supply a new blank.

The sixth part of the said invention relates to the method of adjusting the motions of the chaser to the varying lengths of blanks and to the different form of points, so as to insure the formation of good points, on the screws by making the cam which governs the motions of the sway-bar adjustable on its shaft.

The last part of the said invention relates to the mode of changing the cams that operate the transferrer, the gripping-cam, and the chasing-cam by means of an index-cam, which operates sliding switches through the intervention of sliding rods within the hollow mandrel and the cam-shafts.

In the accompanying drawings, A A represent a bench or platform, which may be extended to any desired length, dependent on the number of individual machines which are to be placed in a line. In Fig. 4 this platform is represented as raised upon the vertical standards A′ A′, through which passes a line-shaft, *b*, on which there is a loose pulley, *c c*, there being a sliding clutch at *d* to engage with said pulley. Around this pulley passes a belt, *e e*, that extends around the pulley Y on the spindle W, which carries the screw-holder or chuck V, said screw-holder containing the jaws that hold the blanks while being cut. On the shaft W is a pinion, Z, which gives motion to the gearing-wheels on the respective spindles. B B is the cast-iron frame-work which supports the principal operating parts of the machine.

F is an inclined hopper, into which the blanks are thrown promiscuously at the upper end. It is sustained above the machine on standards H H, its sides are inclined, and its bottom consists of two parallel inclined rollers, E E, forming inclined ways, placed at such distances apart as to permit the shanks *k* (see Fig. 4) of the blanks to hang freely between them, while the heads rest on their periphery. These two rollers are geared together by two cog-wheels, *d*, and receive a rotary motion by a belt, *b*, passing around the pulleys *i*, so that by the inclination and the rotation the rollers cause the blanks to arrange themselves in regular order, with the shanks *k*, hanging between the rollers and the heads, resting on their upper inclined surface, and the rotation and inclination also cause the blanks gradually to descend toward the lower end, where, in succession, they are received one by one in apertures made in two bars *r r* (see Fig. 13) of a delivery and check slide, *l*, which, being then moved in the direction of the arrow by the inclination of the bars *r r* at the aperture, forces the blank thus received and hanging vertically toward and over the vertical tube *i′*, (see Fig. 12,) made in a projection of one of the standards H. As the slide *l* discharges a blank, its inner face prevents the further delivery of the blank from the roller-ways until its return to receive another. The preferred form of the aperture in the delivery and check slide is represented in plan at Fig. 14, where it will be seen that the diagonal aperture in the bars $r\ r$ is enlarged in the parts $r'\ r'$ to be of sufficient capacity to receive a blank so soon as the slide runs back from one discharge. The blank is there held by the lip-like projection until the slide is again moved forward for the delivery. The bars of the slide work in recesses in the upper part of the delivery-tube $i'$ and between it and the end of the roller-ways, and its periodical movements, which must correspond with the operations of other parts of the machine, are given by an arm, $j'''$, jointed to it by a link, $j''$, the arm $j'''$ being attached to one end of a rock-shaft, $g''$, which passes through and has its bearings in the hollow shaft $i''$ of one of the intermediate cog-wheels. The other end of this rock-shaft has another arm, $f''$, operated by a cam, X, on the shaft of the index-cam J, which makes but one revolution to each complete operation of the machine, and therefore the position of this cam is such relatively to the index-cam as to deliver one blank for each operation. The arm $f''$ is borne up to the face of its cam by a spring, $h''$. (See Figs 4 and 11.) The delivery and check slide $l$ is made with two sets of bars, $r\ r'$, to leave room between them for the journals of the two hopper-rollers, as the check-face of the slide should be nearly in contact with the end of the rollers. One of these bars may be dispensed with; but the two are useful to keep the blank vertical as it is moved out over the receiving and grinding tube. Before a blank is discharged from the row in the roller-ways the transferrer $x$ must be put in position at the lower end of the conducting-tube $i'$. This transferrer $x$ has a hole in it of sufficient capacity to receive the end of a screw-blank as it descends, and a bottom to prevent the blank from descending too far and to prevent the blank from falling out during the operation of transferring. This hole is made half and half in the contiguous faces of two blocks, the two blocks being on the ends of springs $x''\ x''$, projecting from an arbor, $l'$.

On the lower end of the conducting-tube $i'$ there is a small wedge, $x'''$, (see Figs. 2 and 15,) so that when the transferrer is brought to the receiving position its two parts $x$ are forced apart slightly by the wedge to permit the blank to drop in freely, and, as it moves from the conducting-tube to transfer the blank, in leaving the wedge the two parts are closed by the tension of the springs $x''\ x''$ to hold the blank with sufficient force to prevent it from accidentally dropping out. The arbor $l'$ of the transferrer rocks in a slide, $l''$, adapted to move in a slot, $j'$, of the frame. After the blank has been received in the transferrer, it (the transferrer) is turned to bring the blank to a horizontal position, which is effected by a lever, $h'$, that turns on a stud-pin, its upper end being connected by a link, $k'''$, with an arm, $k'$, of the rocking-arbor $l'$. Its lower end is provided with a cam-pin that runs in a cam-groove, $o''$, cut in the surface of a cylinder, P, on the shaft Q, by which the required movements are given. The transferrer is then pushed forward to introduce the head of the blank in the end of the mandrel by means of a lever, $e'\ e'$, (see Fig. 4,) that turns on a stud-pin, $l''''$, its upper end being forked to embrace a pin' $l'''$, connected with the slide $l''$ (in which turns the arbor $l'$) by a rod, $j''''$, and its lower end is provided with a cam-pin that runs in a cam-groove, $m''$, (cut in the surface of a cylinder, O, on shaft Q,) which gives the requisite motion to the lever. After the head of the blank has been inserted in the end of the mandrel, and there held by suitable means, the transferrer retrogrades by the same movements in an inverse order to receive another blank.

The form of the cam-grooves $o''$ and $m''$ on cylinders O and P is fully represented in Figs. 2 and 4, where it will be seen that these grooves run entirely around the cylinders in the direction of the periphery, and that there is a lateral groove, $p''\ n''$, in each, which runs thereform diagonally and into it again, and where they run out, there is a sliding switch, $e'$, in cylinder $o$, and a corresponding one, $g'$ in the other, to keep the cam-pins in the grooves $o''\ m''$ to permit the cylinders to rotate without moving the levers during the operation of chasing the threads on the screw; but where a new blank is to be supplied these switches are shifted to close the direct grooves and open the lateral ones to give the required movements to the levers $h'$ and $e'$. This shifting of the switches is effected in the following manner: The cam-cylinders O and P are made partly hollow to receive the sliding switches, which are connected by means of cross-levers $d'$ and $f'$ with a sliding rod, $b'$, within the hollow cam-shaft Q, which is slotted for the passage and play of the cross-levers, and this sliding rod is connected by means of a swivel-collar with a lever, $a'$, the lower end of which turns on a joint-pin and the other end embraced by a sliding collar, $y$, on the shaft M, connected by a pin, $z$, (see Fig. 5,) with a sliding rod, S, within the shaft, which is slotted for the play of the pin $z$, the end of the sliding rod being connected by a collar, $q''$, with one end of a lever, $q$, that turns on a fulcrum-pin, $p'''$, its lower end being made to embrace the fillet of the index-cam J on the shaft K, by which the switches are shifted. This cam makes but one revolution to each complete operation of the machine, and the cam-fillet, from 2 to 1 in the direction the reverse of the arrow, runs at right angles to the axis for the purpose of keeping the diagonal grooves $p''\ n''$ closed. At 1 it takes a diagonal direction to 4, to open these diagonal grooves, that they may operate the levers, and during this operation the index-cam fillet runs in the direction of the periphery from 4 to 3, and then it takes a diagonal direction back to 2, for the purpose of shifting the switches back again to close the grooves $p''\ n''$.

The form of the lateral grooves $p''$ $n''$ is as follows: The groove $p''$ in cylinder P is the one which operates lever $h'$ and the transferrer $x$ to move the blank from a vertical to a horizontal position. When the switch $g'$ is shifted to close the direct groove $o''$, it runs from the direct groove to 1 in an oblique direction, (as represented by dotted lines in Figs. 4 and 5,) to change the blank from the vertical to a horizontal position. At this time the lever $e'$ $e'$ begins to push the blank horizontally to introduce it in the mandrel, which motion is effected by the lateral cam-groove $n''$ of the cylinder O, that runs diagonally from the switch $e'$ to the point 2. (See Figs. 4 and 5.) During this motion, however, it will be obvious, from the connection of the transferrer by means of the arm $k'$ with the lever $h'$, (by which it is vibrated,) that the horizontal movement would cause it to vibrate back again in part, and to prevent this the groove on cylinder P runs from 1 to 3 (see Fig. 4) in the reverse direction to retain the transferrer in a vertical position, and then the grooves $p''$ and $n''$ run into the direct groove by similar angles reversed. The jaws $g$, that take and hold the blank in line when presented to them by the transferrer, are three in number and are connected to a chuck, V, on the end of the hollow mandrel W. The chuck is hollow and has three parallel bars, $v$, (dividing the circle into three equal parts,) to which the jaws are connected in the following manner: To the bars $v$ are connected by a joint-pin the levers $g''$, the back ends of which are provided with two adjusting-screws, $m'''$—one for each—and their forward ends are jointed by links $i''$ to the jaws $g$, which are adapted to the shank and head of the blanks. The jaws run back some distance to form a connection by joint-pins with arms on the end of a rod, $o$, that passes through and slides within the mandrel W to form a connection, by means of a collar, with a slide, $n'$, that has a cam-pin, $m$, operated by a groove-cam, I, on the shaft M, so that by the sliding of this rod $o$ the jaws operate in the manner of a toggle joint to close on or liberate the screw-blank. When the jaws are closed, the cam-pin of the slide, during the operation of chasing, runs in that part of cam-groove I which runs entirely around in the direction of the periphery; but when the jaws are to be opened for the purpose of discharging a cut screw and to receive a screw-blank a sliding piece, $p$, is moved in the position represented in Fig. 3, which changes the direction of the groove and makes it diagonal for a short distance to open the jaws, that the finished screw may be discharged, then parallel to hold them open while another blank is introduced, and then in a diagonal direction back again to close on the blank. The shifting of the sliding piece $p$ to make this change is effected by the index-cam J in the same manner as the shifting of the switches in the cam grooved cylinders O P by connecting the shifting piece $p$ with the rod S, which slides in the shaft M of the cam, the sliding rod being connected by a bar, $r'''$, with the lever $q$, operated by the index-cam J, as before described. On that end of the sliding rod $o$ which is connected with the grippers there is a tubular cylindrical projection, $y'$, (see Fig. 6,) in which slides a turn-screw, Z', with projections at the back end that pass through elongated holes in the tube, and acted upon by a helical spring on the cylindrical projection, by which the turn-screw is forced up against the head of the blank, so that when the blank is introduced by the transferrer the turn-screw is forced back, and, if the neck be not properly presented for its reception, the moment the chaser takes effect the rotation brings them in line, and the turn-screw is forced into the nick by the tension of the spring, and then the blank is turned by the turn-screw, and the jaws merely hold it in a central direction, which avoids the mutilating of the shank and head by a grip such as is required when rotated by the grip of the jaws alone. Another purpose of the spring on the turn-screw is that the spring, being under tension, the moment the jaws are sufficiently opened to liberate the finished screw it is forced directly out of the mandrel, thus avoiding the possibility of a fresh blank being introduced before the finished screw is discharged. After the blank has been introduced and the transferrer has moved out of the way, the chasing operation commences, and it is important during this operation to support the shank of the blank by a rest opposite to the chaser, and therefore, and for this purpose, both the chaser and rest are connected with and carried by the sliding carriage N. The carriage N is connected with the back of the frame by means of a bolt, $d''$, that passes through and slides in a slot, $z''$, in the frame, and to the end by a cylindrical rod, N'', projecting from it, which slides in an appropriate box at the end of the frame. The rest $c''$ is mounted in a proper manner in a socket in the back of the carriage to admit of adjustment, and the chaser $u''$, which is opposite to it, is secured in like manner to an adjustable head, N', jointed to the lower part of the carriage at $b''$, and so situated relatively to the point of the chaser that a circle struck from the center of this joint will intersect the axis of the blank and the point of the chaser when properly adjusted. The adjustable head is provided with a swivel-box, $y''$, that slides on a rod, $a'''$, connected by means of two links, $s''$ $s''$, at $t''$ $t''$ with a sway-bar, U U, by which the chaser is moved toward and from the blank during the operation of chasing the screw; and the carriage receives its motion for chasing and running back the chaser and rest by means of a cam-groove, $t'''$, cut in the surface of the cylinder L on the shaft M, that carries the cam, before described, for opening and closing the jaws, and this groove receives a cam-pin attached to the carriage. This groove, from the point 1 to 2 in the direction the reverse of the arrow, (see Fig. 4,) is in the form of a regular helix, and from 2 it runs back in a regular curve to 1, so that during the rotation of the shaft, as the cam-groove passes the cam-pin on the carriage from 1 to 2, the chaser is regularly drawn from that part of the thread nearest the head to the point to chase the thread, that motion of the chaser relatively to the number of revolutions of the mandrel determining the pitch of the thread. At the end of each cut the chaser is run back by the passage of the cam-groove from 2 back to 1. When the thread is completed, the carriage, with its chaser, must be moved out of the way until the completed screw is discharged and another blank supplied, which is effected by the lateral cam-groove *w*, that runs out diagonally from the groove *t'''*. At 2 and at 3 it takes a direction at right angles to the shaft and continues so, holding the carriage back until it reaches the point 4, (see dotted lines, Fig. 4,) where it runs diagonally back again into groove *t'''*, preparatory to another operation. The cam-pin on the carriage is made to follow either of these grooves by means of a sliding switch, *t*, connected with the sliding rod S in the cam-shaft M by a lever, *u*, (see Fig. 5,) and operated by the index-cam J, as in manner fully pointed out in the description of the mode of closing the jaws.

During the operation of chasing the thread, which is done by several successive cuts, the chaser must be drawn back clear of the thread before the carriage can be carried back to commence the next cut. For this purpose it is that the chaser-head is connected with the sway-bar U U', as stated above, and for the further purpose of determining the taper of the screw to be cut one end of this sway-bar is jointed to a block, *w'*, (see Fig. 1,) that slides in the frame governed by two set-screws, *x' x'*, on opposite sides of the frame, by which the point of the chaser can be adjusted horizontally with accuracy during the operation of the machine, and the other end of this sway-bar is provided with a cam-pin, *v'''*, that is operated by a cam-groove, *w''*, on a transverse shaft, T, driven by bevel cog-wheels on it and the cam-shaft M, the wheels being of the same diameter to insure the turning of the two by equal motions. The form of this cam-groove, which is cut in the surface of a short cylinder, is from the point 1 to 2 (in the direction of the arrow) in the form of a regular helix to move the point of the chaser toward the axis of the blank to give a regular taper to the screw, if it be desired to make the screw tapering; but if the screw is to be made cylindrical, or without taper, then this part of the groove must run at right angles to the shaft. As the chaser approaches the end of the screw, the groove runs out of the line of the helix with a sudden curve, to form what is called the "gimlet-point" to the screw, the form of this part of the cam being governed by the form of the intended point of the screw. From this the groove takes a reversed diagonal direction to draw the chaser far enough back to clear the threads when the carriage is run back, the groove running at right angles to the shaft during this motion of the carriage; and, finally, it takes the reversed diagonal direction, running into the helical part of the groove to recommence the cut; but, as the thread is chased by several successive cuts, it is necessary that the chaser should, at each successive cut, be carried the thickness of one shaving nearer to the axis of the screw. For this purpose the cam slides on its shaft, (which is hollow,) and it is so attached to a sliding rod, *p''''*, within the shaft by means of a feather, rod, or bayonet, *q'''*, that passes at right angles through a slot in the shaft. The outer end of this rod is connected by a collar with a lever, *m'*, which turns on a joint-pin at *o'''*, and its lower end is provided with a cam-pin, *q'*, attached to it by adjusting-nuts *r''''*, which run in a cam-groove, Y', cut in the face of a wheel, R, on the shaft K of the index-cam J. The position of this cam on the shaft, relatively to the index-cam and its form, is such (as represented in the drawings) that at the commencement of the operation of chasing a screw the cam-pin is nearest the center of the cam-wheel, and its diameter increases irregularly, so as to move the chaser toward the axis of the screw less for each successive cut to give a good finish to the thread, the last operation being rather to clean the thread than to cut, and then the cam runs by a more sudden curve back to the place of beginning; and for the purpose of adjusting the cam groove *w''* to the length of thread to be cut its cylinder is made adjustable on the shaft by connecting it with the feather, rod, or bayonet of the sliding rod *p''''* by the intervention of a circular plate, *s'''*, to which it is attached by screws *i'''*, that pass through slots in the plate in manner well known to mechanical engineers. Motion is communicated to the mandrel W, and from this to the other shafts, by a succession of cog-wheels and pinions, as fully represented in the drawings, the direction of the rotation of each being indicated by arrows. It is only necessary in this connection to state that the relative revolutions of the mandrel and chasing-cam will depend on the diameter, length, and pitch of the thread to be cut, the relative revolutions of the mandrel and chasing-cam and pitch of the chasing-cam, together with the diameter and length of the screw, determining the pitch of the thread, and the relative revolutions of the chasing-cam and index-cam determining the number of cuts to be given for the complete chasing of the screw, it being observed that the index-cam must make but one revolution to each complete operation.

It will be obvious that the various parts of this machine are susceptible of modifications without changing the principles of the said invention—as, for instance, the transferrer can be operated to transfer the blank from the conductor to the mandrel by a different arrangement of levers and cams, and instead of operating them by means of cams having sliding switches to admit of several revolutions to each complete operation of the machine, the same end may be obtained by common cams making but one revolution, and the transferrer itself may be differently constructed, so long as it performs the function assigned to it.

It will be obvious that some of these improvements may be employed without others, and to other branches of the manufacture of screws, but when applied to threading the best results will be obtained when used together; or, for instance, the hopper, roller-ways, and discharging-slide may be omitted and the blanks supplied to the conductor by hand, and the advantage arising from the use of the conductor and conveyer retained, for this device presents a decided advantage for hand or other modes of feeding over all other previously-known modes of presenting the blank to the rotating mandrel, and so with other operations too numerous and not necessary to mention.

What is claimed as the invention of the said THOMAS W. HARVEY, and desired to be so secured by Letters Patent, is—

1. The combination and arrangement of two inclined rollers, one or both rotating and placed at a sufficient distance apart to permit the shanks of the blanks to hang therein freely suspended by their heads, substantially as described, and for the purpose of arranging the blanks (when presented in a promiscuous mass) all in a row with their heads up, and causing the row to travel toward the lower end and to be delivered one by one, as set forth.

2. Combining with the delivery end of the inclined rollers or equivalent ways for supplying the blanks in order, a delivery and check slide, and a receiving and conducting tube or equivalent therefor, substantially as described, to receive the blanks from the row, deliver them one by one, and conduct them to the place where they are required for after operations and at the periods required, as set forth.

3. Combining with the receiving and conducting tube, substantially as described, a transferrer, or equivalent therefor, substantially such as described, to receive the blanks from the conductor and transfer them to the mandrel or place where they are to be subjected to the cutting action, as set forth.

4. Combining with the mandrel or spindle, and with suitable means for holding the screw-blanks in line, substantially as described, a sliding turn-screw and spring, or equivalent therefor, substantially as described, and for the purposes set forth.

5. Governing the motions of the chaser toward and from the axis of the blank by combining the chaser-head with a carriage and sway-bar moved by a cam, substantially as described, and also connecting one end of the sway-bar with an adjusting-slide when this is combined with the chaser or chaser-head, as described, whereby the amount of taper to be given to the screw can be regulated at pleasure.

6. Changing the directions of the various cam-grooves by means of sliding switches operated by sliding rods within the hollow cam-shafts, and shifted by an index cam, by which the various changes of the motions of the machine are effected, substantially as described.

7. Making the cam which operates the sway-bar adjustable on its shaft, substantially as described, for the purpose of adjusting the motions of the chaser to the length of the blank to insure the proper formation of the point of the screw, as described.

H. A. HARVEY,
*Assignee.*

Witnesses:
WM. H. BISHOP,
WM. M. INGRAHAM.